Sept. 6, 1966    P. R. WATT    3,271,272
VIBRATORY WIPING DISTILLATION APPARATUS
Filed Dec. 19, 1962    2 Sheets-Sheet 1

INVENTOR
PETER RIDGWAY WATT
BY
Irwin S. Thompson
ATTORNEY

United States Patent Office 3,271,272
Patented Sept. 6, 1966

3,271,272
VIBRATORY WIPING DISTILLATION APPARATUS
Peter Ridgway Watt, Reigate, Surrey, England, assignor to Vitamins Limited, London, England, a British company
Filed Dec. 19, 1962, Ser. No. 245,757
Claims priority, application Great Britain, Dec. 29, 1961, 46,680/61
18 Claims. (Cl. 202—236)

This invention relates to a device for wiping surfaces, especially for wiping films of liquid across surfaces. The wiping device is of especial use for wiping distillate over evaporator surfaces in molecular distillation apparatus. The invention also relates to evaporator assemblies and to distillation apparatus which incorporate the wiping device.

The essential portion of the wiping device of this invention is hereinafter termed a wiper assembly. According to the invention, a wiper assembly comprises a support member and a plurality of wiper members resiliently mounted thereon; the support member and the surface to be wiped are arranged to be movable relative to one another with the wiper members in wiping contact with the surface; the support member is vibratable with a component of its vibration perpendicular to the direction of relative movement; and each wiper member has a wiping edge disposed obliquely to such direction of relative movement.

When the support member is vibrated, this vibration is transferred to the wiper members by the resilient mounting, and causes them to vibrate in contact with the surface to be wiped; by reason of the oblique arrangement of the wiping edges, any material, such as a film of liquid, on the surface is wiped in a direction transverse to that of the relative movement of the surface and wiper assembly. By varying the relative speeds of the two movements and the angle of the wiping edges, material may be wiped in any desired direction.

The invention is especially applicable to the wiping of surfaces of revolution about a vertical axis, and the support member is mounted for rotation about such axis. The wiper assembly is suitably used in this form for assisting the evaporation of a thin moving film of liquid within a molecular still, which includes at least one upwardly-facing, horizontal, annular, heatable evaporator surface and a wiper assembly arranged for wiping a film of distillate upon such surface; the invention also embraces an evaporator assembly which comprises such an evaporator surface and at least one wiper assembly. Preferably, the evaporator surface, being relatively massive, is stationary, and the wiper assembly moves over it.

The present invention also embraces a molecular distillation apparatus, which includes at least one evaporator assembly and a downwardly-facing, horizontal, annular, coolable condenser surface above each evaporator surface. A modular still including opposed pairs of such stationary, horizontal evaporators and condensers is described and claimed in our co-pending application No. 193,259, and the wiper assemblies of the present invention are especially useful in such a still.

The wiper assembly itself comprises, as mentioned, a plurality of wiper members resiliently mounted on a support member.

The support member may be a member elongated in the direction normal to the direction of relative movement and parallel to the surface; to such a bar-shaped support member there may be attached at intervals resilient arms each of which bears a wiper member attached to the arm so as to have an obliquely disposed wiping edge. The wiper members may be rhomboidal blocks, arranged with one face in contact with the surface to be wiped.

Operation of the wiper assembly is facilitated if the wiper members are in trailing contact with the surface, and are composed of a material having a low coefficient of friction therewith.

Vibration of the support member may be conveniently accomplished electromagnetically, by arranging for part of the support member or a projection thereon to be composed of soft iron or other magnetisable material and to be arranged in the force field of an electromagnetic coil fed by alternating current. The support member is mounted so as to be both vibratable and movable relative to the surface, and this may be accomplished by mounting it by springs from one or two support members which are driven over the surface.

In a preferred arrangement, several wiper assemblies are rotated continuously around an axis, and the ends of their support members may be supported from a rim or rims running on bearings, and the inner such rim may, as in the modular still described in our aforesaid application, be a gutter for distributing distillate.

In order that the invention may be readily understood, a preferred embodiment thereof as used in connection with an evaporator surface of a modular still is described below in conjunction with the annexed drawings, in which.

The apparatus shown, except for the wiper assembly, is substantially the same as that described and shown in FIGS. 7 and 8 of our co-pending application No. 193,259, and similar parts have the same references. The wiper assembly of the present invention is essentially differentiated in that it includes a plurality of vibratable wiper members, mounted between the gutter 40 and the guide ring 46, and an electromagnet.

Figure 1:
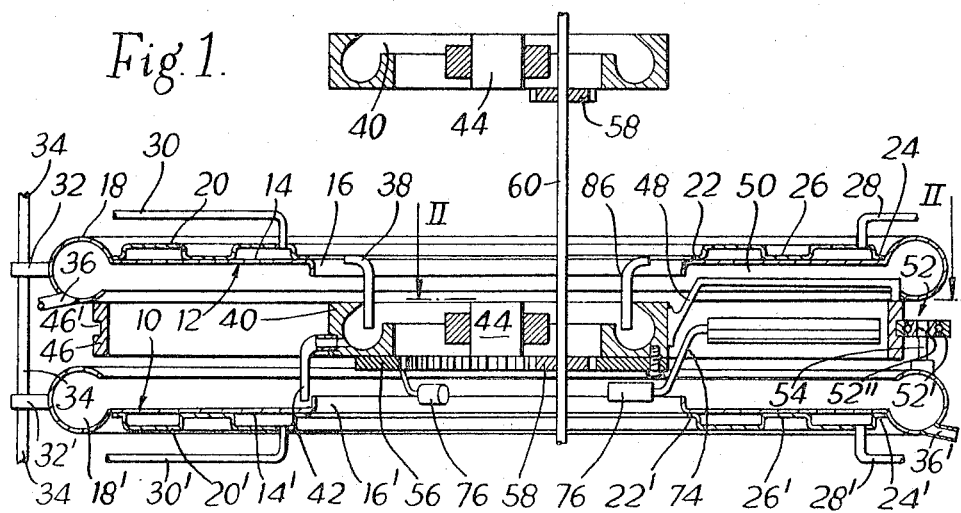
FIG. 1 shows diagrammatically an axial section of parts of a distillation apparatus.
Figure 2:
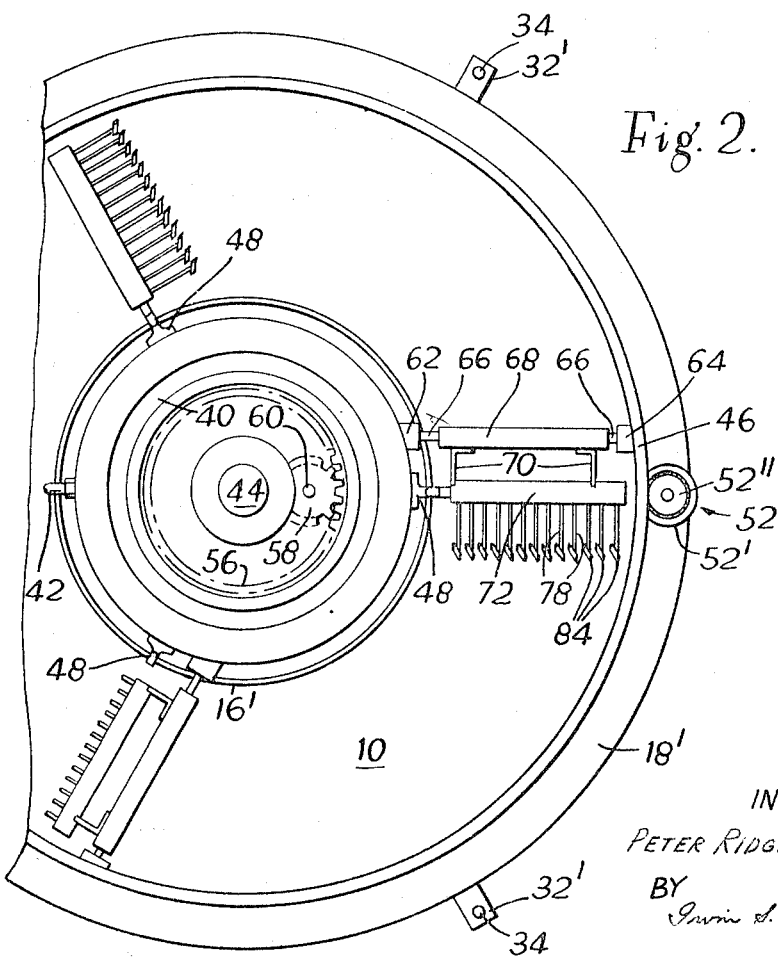
FIG. 2 shows diagrammatically a partial plan view on the line II—II of FIG. 1.
Figure 3:
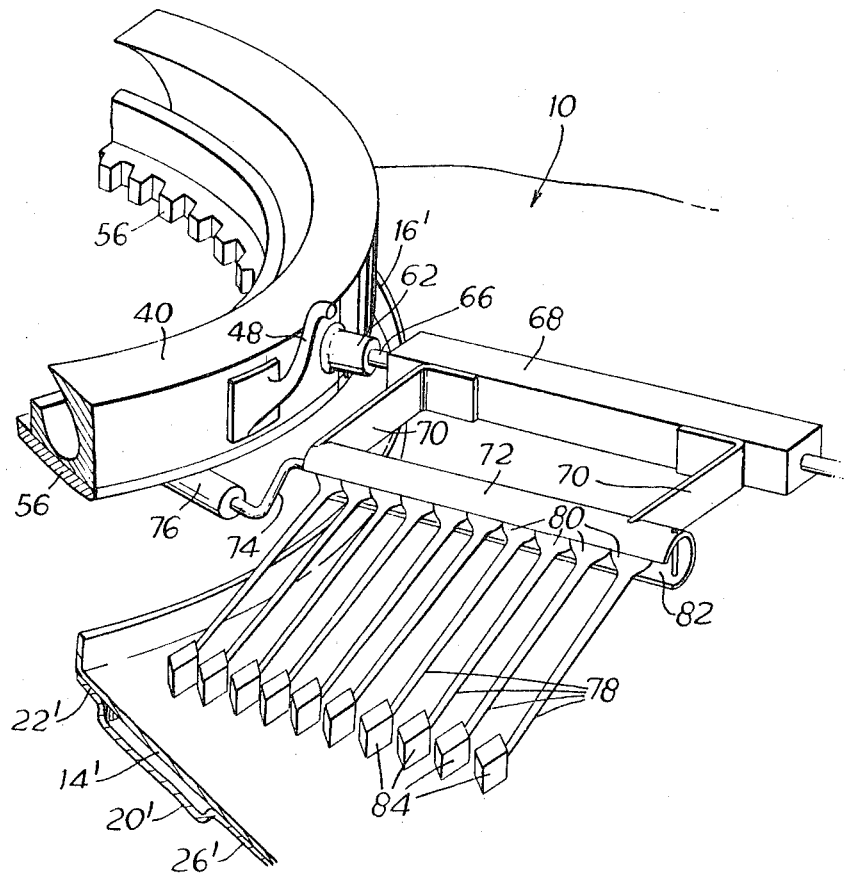
FIG. 3 shows a diagrammatic perspective view of a wiper assembly.

An electromagnetic coil, designated generally at 44, is shown in FIGS. 1 and 2, preferably encased in a protective moulded cover (not shown) and mounted centrally of the gutter 40, for instance upon radial spokes (also not shown).

Referring to the drawings, three identical wiper assemblies are shown for effecting rapid film renewal and also for wiping the distillate film outward toward the gutter 18′. At points in advance of the radial spokes 48, opposed mounting blocks 62 and 64 (FIG. 2) are secured to the outer surface of the gutter 40 and the inner surface of the guide ring 46. The inner faces of these blocks 62 and 64 have aligned holes which receive spring-loaded rods 66 at either end of a square-section bar 68. Alternatively, the bar 68 is otherwise removably mounted between the gutter 40 and the ring 46 with freedom to pivot about its own axis. Two blade springs 70 are secured to the trailing face of the bar 68 and, at their rearward ends, support a longitudinally-slotted tube 72 which lies beneath the adjacent spoke 48 and is therefore located substantially radially of the coil unit 44. At its inner end, the tube 72 carries an inwardly-directed arm 74, cranked to extend beneath the gutter 40 or otherwise shaped as required, so as to locate a soft iron piece 76 on its inner end in the force field produced by energisation of the coil unit 44. The tube 72 carried a plurality of preferably flexible rearwardly and downwardly directed arms 78 by way of integral spheres 80, which are slid into the tube 72 so that the arms 78 project through the longitudinal slot, shown at 82. The trailing ends of the arms 78 carry wiper blocks 84, which are preferably of material having a low coefficient of friction, such as polytetrafluoroethylene, and are of rhomboidal shape, having in plan view a leading surface, and therefore a leading edge in contact with the evaporator surface 10, which is oblique relative to a line parallel to the radial spoke 48. The lower surfaces of the wiper blocks 84 may be serrated or grooved, if desired.

The blade springs 70 are arranged to have a spring rate and length so that energisation of the coil unit 44 with ordinary 50 cs. mains current produces longitudinal oscillation of the tube 72 and the assembly is desirably tuned so as to produce optimum oscillation at 50 cs. or a harmonic thereof. A component of the oscillation is transmitted via the arms 78 to the blocks 84, whereby the latter trace complex sinusoidal saw-tooth or other paths around the evaporator surface 10, as the wiper assembly rotates.

In use, one of the distillation units or a plurality of such units is mounted in an evacuable enclosure, such as described for example in our co-pending application No. 193,259, provided with appropriate supply and return connections for coolant, heating fluid and current and with a driving motor or connection for rotating the layshaft and any other rotary parts of the apparatus, for example, rotary distillate lift pumps.

In operation, distilland is supplied via the pipe 38 to the gutter 40 and distributed via the pipe 42 on to the evaporator surface 10, from which distillation takes place. The distilling film is spread and agitated by the wiping action of the vibrating blocks 84 as they travel round the surface 10 and the residue eventually collects in the gutter 18' and is delivered via the outlet 36'. Condensate forming on the condenser surface 12 is collected and directed laterally outwardly by the scrapers 50 toward the gutter 18 and passes via the outlet 36 to a receiver for distillate, or, in the case of a multi-unit still, to a lift pump operating to supply to a delivery pipe, such as that shown at 86 in FIG. 1, to the distributing gutter 40 of the next unit.

The invention is not limited to the embodiment described. For example, a wiper asssembly may be arranged to run in a reciprocating manner over a linear course; and the evaporator surface may be a vertical cylinder instead of a horizontal plate. The disposition of the wiping edges of the wiper members may be arranged so as to cause distillate to move either inward or outward over an annular evaporator surface.

I claim:

1. A wiper assembly for wiping a surface, which comprises a vibratable support member, a plurality of wiper members resiliently mounted on said support member, drive means for causing relative movement of said support member and said surface with said wiper members in wiping contact with the surface, and vibrator means for imparting vibratory motion to the support member with a component of such vibration perpendicular to the direction of relative movement of said support member and said surface and each wiper member having a wiping edge disposed obliquely to such direction of relative movement.

2. A wiper assembly according to claim 1, in which such surface is a surface of revolution about a vertical axis, and the support member is mounted for rotation about such axis.

3. A wiper assembly according to claim 1, in which the wiper members are in trailing contact with such surface.

4. A wiper assembly for wiping a surface, which comprises an elongated vibratable support member, a plurality of resilient arms each attached by a first end to such support member, a wiper block attached to the second end of each of resilient arms, drive means for causing movement relative of said support member and said surface with said wiper blocks in wiping contact with the surface, and vibrator means for imparting vibratory motion to the support member with a component of such vibration perpendicular to such direction of relative movement and to said wiper blocks, each wiper block having a wiping edge disposed obliquely to such direction of relative movement and to said arms and said wiper blocks, each wiper block having a wiping edge disposed obliquely to such direction of relative movement.

5. A wiper assembly according to claim 4, in which such surface is a surface of revolution about a vertical axis and the support member is mounted for rotation about such axis.

6. Apparatus for wiping a surface of revolution disposed about an axis, which includes at least one wiper assembly according to claim 5, and an electromagnetic coil situate axially of such surface for generating an electromagnetic field, and in which a portion of the support member of each wiper assembly is magnetisable and projects axially into such electromagnetic field.

7. A wiper assembly according to claim 4, in which the wiper blocks are in trailing contact with such surface.

8. An evaporator assembly for causing evaporation of a thin moving film of distilland within a molecular still, which comprises an upwardly facing, horizontal, annular, heatable evaporator surface and at least one wiper assembly according to claim 7 for wiping such distilland toward the periphery of such surface.

9. A wiper assembly for wiping a surface, which comprises a longitudinally vibratable tubular support member having a longitudinal slot therein, a plurality of resilient arms each having an enlarged terminal portion retained within the tubular support member and a shank portion projecting through such slot, a plurality of rhomboidal wiper blocks, each of said wiper blocks being attached to the free end of one of said resilient arms and having a wiping edge for wiping such surface, motor drive means for causing relative movement of the support member and such surface with the wiping edges in wiping contact with such surface, and electromagnetic vibrator means for imparting to the support member a longitudinal vibratory motion having a component perpendicular to such direction of relative movement, each of such wiping edges being disposed obliquely to such direction of relative movement.

10. A wiper assembly according to claim 9, in which such surface of revolution about a vertical axis, and the support member is mounted for rotation about such axis.

11. A wiper assembly according to claim 9, in which the wiper blocks are in trailing contact with such surface.

12. Apparatus for wiping a surface of revolution disposed about an axis, which includes at least one wiper assembly according to claim 9, an electromagnetic coil, a source of alternating current for energising said coil to generate an electromagnetic field, and in which a portion of the support member of each wiper assembly is magnetisable and projects axially into such electromagnetic field, each assembly being tuned to vibrate at the frequency of such alternating current or a harmonic thereof.

13. An evaporator assembly for causing evaporation from a thin moving film of liquid within a molecular still, which comprises an upwardly-facing, horizontal, annular, heatable evaporator surface, and at least one wiper assembly for wiping a film of distilland upon such surface, such wiper assembly comprising a vibratable support member, a plurality of wiper members resiliently mounted thereon, drive means for causing relative movement to the support member and the evaporator surface with the wiper members in wiping contact with the surface, and vibrator means for imparting vibratory motion to the support member with a component of such vibration perpendicular to such direction of relative movement, and each wiper member having a wiping edge disposed obliquely to such direction of relative movement.

14. An evaporator assembly according to claim 13, which includes a plurality of wiper assemblies and in which said vibrator means comprises an electromagnetic coil situate axially of the evaporator surface for generating an electromagnetic field, and a magnetisable portion of the support member of each wiper assembly which projects axially into such electromagnetic field.

15. A molecular distillation unit for mounting in an evacuable enclosure, which comprises the evaporator assembly of claim 14, a downwardly-facing, horizontal, annular, coolable condenser surface above the evaporator, connections for heating each evaporator surface and for cooling each condenser surface and for supplying current to the electromagnetic coil, and drive means for rotating the support members of the evaporator assemblies.

16. Apparatus for effecting molecular distillation, which, includes at least one evaporator assembly as set forth in claim 13 and a downwardly-facing, horizontal, annular, coolable condenser surface above such evaporator assembly.

17. An evaporator assembly for causing evaporation of a thin moving film of distilland within a molecular still, which comprises an upwardly-facing, horizontal, annular, heatable evaporator surface, an electromagnetic coil energisable by a source of alternating current so as to produce an electromagnetic field, an inner and an outer rim arranged for rotation about the axis of the evaporator surface, a plurality of radial mounting members radially connected to the rims, a tubular support member having a slot cut along its length and being secured to each mounting member so as to permit vibration of such support member under the influence of said electromagnetic field, a plurality of resilient arms each having an enlarged terminal portion retained within the support member and a shank portion projecting through such slot, and a plurality of rhomboidal wiper blocks, each of said wiper blocks being attached to the free end of one of said resilient arms and having a wiping edge in trailing contact with the evaporator surface during rotation of said mounting members, each tubular support member having a magnetisable portion which projects axially into the electromagnetic field to cause said vibration, at least a component of such vibration being radial of the axis of the evaporator surface, and each wiper block having its wiping edge disposed obliquely to the radius of the evaporator surface.

18. Apparatus for effecting molecular distillation, which includes at least one evaporator assembly as set forth in claim 17 and a downwardly-facing, horizontal, annular, coolable condenser surface above such evaporator assembly.

References Cited by the Examiner

UNITED STATES PATENTS

| | | | |
|---|---|---|---|
| 2,218,240 | 10/1940 | Hickman | 202—236 X |
| 2,308,008 | 1/1943 | Hickman | 202—236 X |
| 2,554,546 | 5/1951 | Zahm. | |
| 2,993,842 | 7/1961 | Smith | 202—236 X |

FOREIGN PATENTS 1,136,982  9/1962  Germany.

NORMAN YUDKOFF, *Primary Examiner.*